United States Patent [19]

Saga et al.

[11] Patent Number: 4,627,990

[45] Date of Patent: Dec. 9, 1986

[54] METHOD OF AND APPARATUS FOR SUPPLYING POWDERY MATERIAL

[75] Inventors: Toshihiko Saga; Tsuyoshi Makita; Hisao Hirono; Akitaka Inao, all of Saitama, Japan

[73] Assignee: Honda Giken Kogyo Kabushiki Kaisha, Tokyo, Japan

[21] Appl. No.: 708,916

[22] Filed: Mar. 6, 1985

[30] Foreign Application Priority Data

Mar. 7, 1984 [JP] Japan .................................. 59-44250
Apr. 9, 1984 [JP] Japan .................................. 59-70678
Apr. 9, 1984 [JP] Japan .................................. 59-70679

[51] Int. Cl.⁴ .......................... B05D 1/00; B05D 3/12
[52] U.S. Cl. ......................................... 427/10; 118/47;
118/302; 118/608; 118/612; 118/620; 118/713;
219/76.16; 219/121 PB; 219/121 PL; 427/34;
427/37; 427/57; 427/180; 427/189; 427/191;
427/319; 427/422; 427/423
[58] Field of Search .................. 427/57, 37, 34, 10,
427/180, 189, 191, 319, 422, 423; 118/612, 47,
620, 302, 713, 608; 219/121 PB, 121 PL, 76.16

[56] References Cited

U.S. PATENT DOCUMENTS

| | | | |
|---|---|---|---|
| 2,961,335 | 11/1960 | Shepard | 427/423 |
| 3,347,698 | 10/1967 | Ingham | 427/57 |
| 4,262,034 | 4/1981 | Andersen | 219/121 PL |
| 4,500,038 | 2/1985 | De Ferrari | 427/34 |

*Primary Examiner*—Norman Morgenstern
*Assistant Examiner*—Janyce A. Bell
*Attorney, Agent, or Firm*—Armstrong, Nikaido, Marmelstein & Kubovcik

[57] ABSTRACT

A method of and an apparatus for supplying a powdery material to a workpiece to be processed thereby. According to the method, the powdery material is discharged from a hopper and metered, and then fed into a tube extending in the vicinity of the workpiece. Ultrasonic vibrations are imparted to the tube to supply the powdery material to a portion to be processed of the workpiece while the amount of the supplied powdery material is being detected. The apparatus includes a hopper for storing the powdery material, the hopper having an outlet, a tube extending from the outlet to a position adjacent to the workpiece for conveying the powdery material therethrough, and an ultrasonic vibrating device mounted on the tube for imparting ultrasonic vibrations to the tube, and a device mounted on the tube for detecting the amount of the powdery material supplied through the tube.

16 Claims, 6 Drawing Figures

METHOD OF AND APPARATUS FOR SUPPLYING POWDERY MATERIAL

BACKGROUND OF THE INVENTION

1. Field of the Invention

The present invention relates to a method of and an apparatus for supplying a powdery material such as of a hard metal to a molten pool when forming a remelted and hardened layer on a surface of a cast iron member.

2. Description of the Prior Art

Cast iron members such as camshafts employed in internal combustion engines are required to have surface layer such as a sliding surface which is of a better wear-resistance and pitting-resistance than the rest of the cast iron member. To meet such a requirement, the applicant has proposed in a earlier application to remelt the surface layer, add powder of a hard metal to the molten pool, and chill the molten area to thereby form a hard layer that is highly resistant to wear and pit corrosion.

In the above remelting and hardening process, it is general to add the metal powder to the molten pool by supplying the metal powder through a supply tube to a burner nozzle while the metal powder is floating in dry air or an inert gas. However, the metal powder as it is supplied under the floating condition tends to be deposited on the inner wall surface of the supply tube, with the result that the substantial inside diameter of the tube is reduced, making it impossible to feed the metal powder stably. As a consequence, the metal powder is supply in irregular quantities which adversely affect the quality of the remelted members.

A conventional solution to the above difficulties has been to plate the inner wall surface of the supply tube or to construct the supply tube of a material having a low coefficient of friction. These prior measures however have failed to sufficiently prevent metal powder from being deposited on the inner wall surface of the supply tube.

SUMMARY OF THE INVENTION

The present invention has been made in view of the aforesaid drawbacks of the prior art.

It is an object of the present invention to provide a method of supplying a powdery material such as of a hard metal stably through a supply tube without causing deposits and clogging therein toward a molten pool formed by remelting a surface layer of a cast iron member, thus producing a hardened surface layer of uniform and stable quality, which is highly resistant to wear and pitting.

Another object of the present invention is to provide a powdery material supplying apparatus by which the above method can be carried out.

According to the present invention, there is provided a method of supplying a powdery material to a workpiece to be processed thereby, comprising the steps of discharging the powdery material from storage means, feeding the powdery material discharged from the storage means into tube means extending in the vicinity of the workpiece, and ultrasonically vibrating the tube means for supplying the powdery material therethrough to the workpiece.

According to the present invention, there is also provided an apparatus for supplying a powdery material to a workpiece to be processed thereby, comprising storage means for storing the powdery material, the storage means having an outlet, tube means extending from the outlet to a position adjacent to the workpiece for conveying the powdery material therethrough, and an ultrasonic vibrating device mounted on the tube means for imparting ultrasonic vibrations to the tube means.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
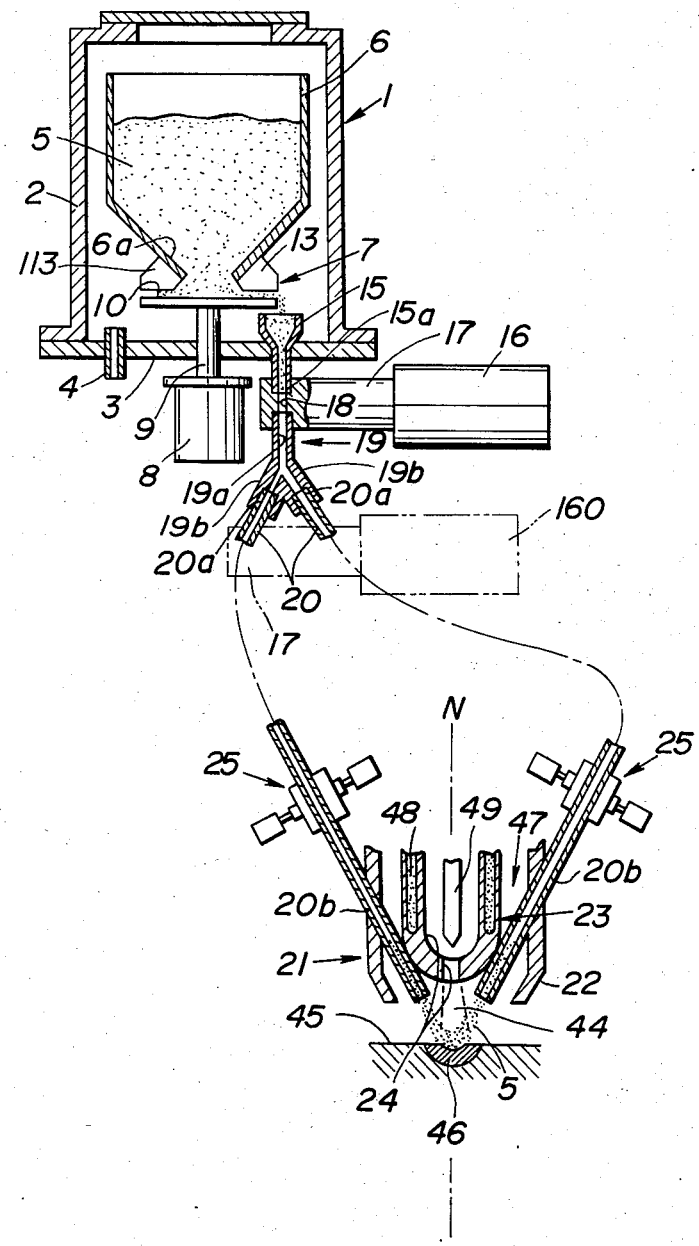
FIG. 1 is a cross-sectional view of an apparatus for supplying a powdery material according to the present invention.

FIG. 1 shows in cross section an apparatus for supplying a powdery material according to the present invention. The apparatus includes a powdery material feeding device 1 composed of a closed housing 2 including a bottom 3 on which there is mounted a pipe 4 for supplying therethrough an inert gas such as an argon gas into the housing 2 to keep the interior thereof under a positive pressure.

Figure 2:
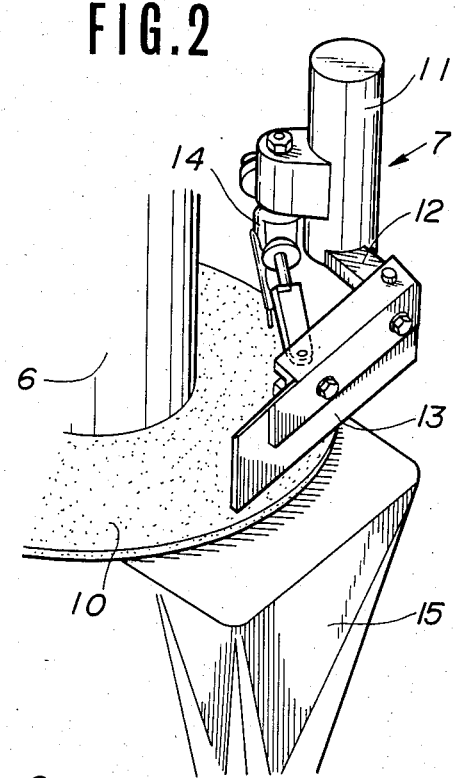
FIG. 2 is a perspective view of a metering device in the apparatus of FIG. 1.

A hopper 6 storing a powdery material 5 therein is disposed in the housing 2. The powdery material 5 may comprise a hard metal such as Cr, Mo, Ni, W, V, or Nb, or a compound thereof which is reduced to a powdery state. The hopper 6 includes a funnel-shaped lower portion having an outlet 6a positioned above a device 7 for metering the powdery material 5. As shown in FIGS. 1 and 2, the metering device 7 is composed of a motor 8 disposed below the bottom 3 and having a rotatable shaft 9 extending upwardly through the bottom 3 and having an upper end positioned beneath the outlet 6a of the hopper 6 and supporting a turntable 10 rotatable in a horizontal plane.

As shown in FIG. 2, a vertically movable base 11 positioned upwardly of a peripheral edge of the turntable 10 includes a bracket 12 on which there is pivotally mounted a metering blade 13 lying in a vertical plane and elongated horizontally, the metering blade 13 being spaced a small clearance from the upper surface of the turntable 10 and angularly movable in the horizontal direction. The metering blade 13 is angularly adjustable in the horizontal direction with respect to the base 11 by a position adjusting screw 14 fixed to the base 11. A funnel-shaped receiver 15 is mounted on the bottom 3 below the metering blade 13 with the turntable 10 interposed therebetween.

Referring back to FIG. 1, another metering blade 113 which is also vertically positionally adjustable is disposed above the turntable 10 in diametrically opposite relation to the metering blade 13. The metering blade 113 serves to level the powdery material 5 supplied from the outlet 6a onto the turntable 10.

The powdery material 5 stored in the hopper 6 is supplied through the outlet 6a onto the turntable 10. When the turntable 10 is rotated by the motor 8, the powdery material 5 on the turntable 10 is scraped by the metering blade 13 off the turntable 10 into the receiver 15. The amount of the powdery material 5 thus supplied into the reciever 15 can be adjusted by either vertically moving the base 11 to vary the clearance between the metering blade 13 and the upper surface of the turntable 10, or turning the metering blade 13 or 113 horizontally with respect to the turntable 10.

The funnel-shaped receiver 15 has a lower tubular portion extending vertically through and supported by the bottom 3. The lower tubular portion of the receiver 15 has a lower end 15a fitted in a vibrator 17 of an ultrasonic vibrating device 16. The vibrator 17 has a passage 18 defined vertically therethrough and having an upper larger-diameter recess in which the lower end 15a of the receiver 15 is fitted. The passage 18 also has a lower larger-diameter recess in which an upper end of an inverted Y-shaped joint 19 is fitted. The passage 18 has an inside diameter equal to the inside diameter of the lower tubular portion of the receiver 15 and also to the inside diameter of a passage 19a defined in the joint 19.

The joint 19a has a pair of divided tubes 19b, 19b to which the upper ends 20a, 20a of supply tubes 20, 20 are connected, respectively. Each of the supply tubes 20, 20 is made of stainless steel or a ceramics material, and has a lower end 20b extending through and held by a shield cap 22 of a plasma torch nozzle 21. The lower ends 20b of the supply tubes 20, 20 supported by the shield cap 22 have their axes substantially crossing the central axis of a passage 24 defined in a nozzle tip 23 for blowing a plasma gas downwardly therethrough.

Figure 3:
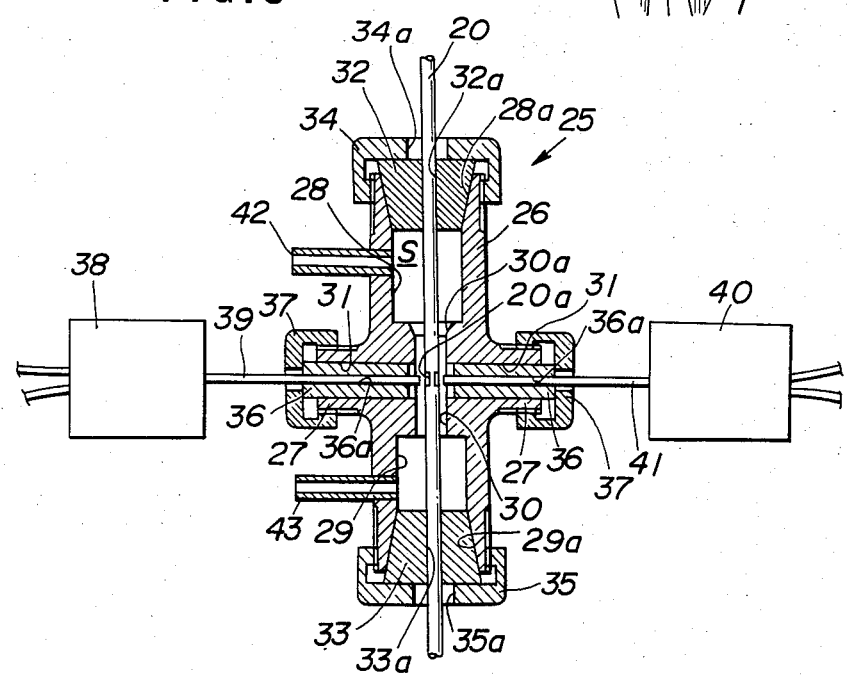
FIG. 3 is a cross-sectional view of a device for detecting the supplied amount of a powdery material.
Figure 4:
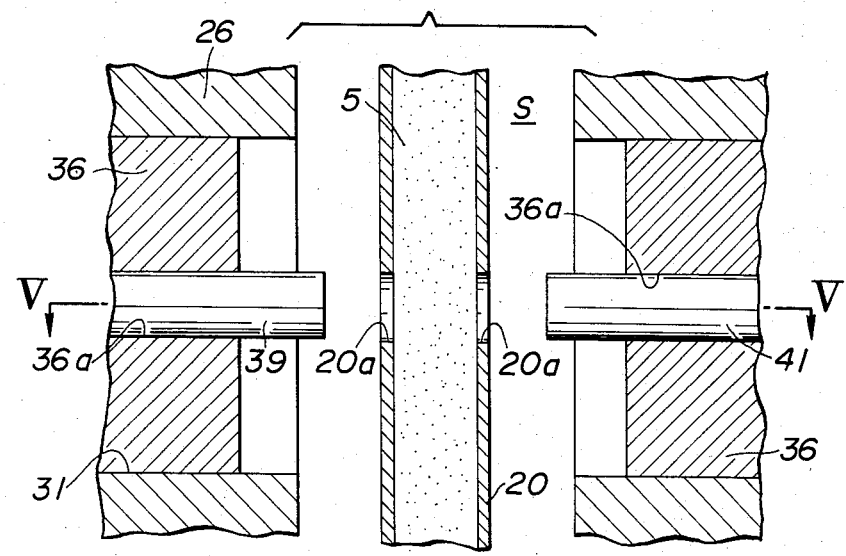
FIG. 4 is a fragmentary enlarged cross-sectional view of the device shown in FIG. 3.
Figure 5:
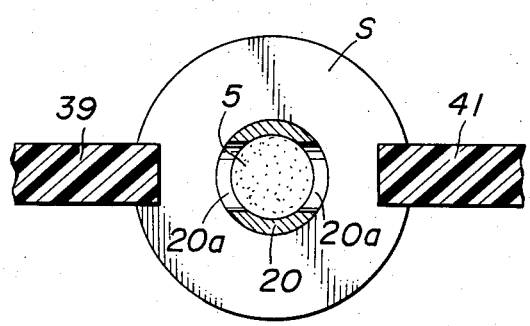
FIG. 5 is a cross-sectional view taken along line V—V of FIG. 4.

A device 25 for detecting the amount of the supplied powdery material is mounted on the intermediate portion of each of the supply tubes 20, 20. As shown in FIGS. 3, 4, and 5, the device 25 includes a body 26 comprising a vertically elongate tubular member having on its intermediate portion a pair of arms 27, 27 projecting laterally outwardly away from each other. The body 26 has upper and lower larger-diameter holes 28, 29 defined vertically therein and an intermediate smaller-diameter hole 30 defined vertically therein and communicating with the upper and lower larger-diameter holes 28, 29. The arms 27, 27 have transverse holes 31, 31, respectively, defined therein and having ends opening into the small-diameter hole 30 and opposite ends opening outwardly. The upper larger-diameter hole 28 has an upper tapered end 28a flaring upwardly, and the lower larger-diameter hole 29 has a lower tapered end 29a flaring downwardly. The intermediate smaller-diameter hole 30 has a tapered upper end 30a flaring upwardly.

Sealing plugs 32, 33 are force-fitted respectively in the upper and lower tapered ends 28a, 29a of the body 26. Caps 34, 35 are threaded respectively over externally threaded surfaces of the upper and lower ends of the body 26 to keep the sealing plugs 32, 33 pushed in the tapered ends 28a, 29a. The sealing plugs 32, 33 have through holes 32a, 33a axially defined respectively therein with the supply tube 20 force-fitted in and retained by the through holes 32a, 33a. The caps 34, 35 have holes 34a, 35a defined respectively therein and having a diameter larger than that of the supply tube 20, which extends through the holes 34a, 35a. In assembly, the supply tube 20 is inserted axially through the body 26 and extends through the holes 32a, 33a in the sealing plugs 32, 33, and then the caps 34, 35 are threaded over the ends of the body 26. The body 26 is now supported on the supply tube 20. When the supply tube 20 is inserted in the body 26, the supply tube 20 should be adjusted to bring a pair of diametrically opposite windows 20a, 20a defined in the supply tube 20 into confronting relation to the transverse holes 31, 31 in the arms 27, 27, respectively.

Tubular sealing plugs 36, 36 are inserted respectively in the transverse holes 31, 31, and caps 37, 37 are threaded respectively over the arms 27, 27. An optical fiber 39 extending from a light-emitting device 38 is force-fitted in a through hole 36a defined axially in one of the sealing plugs 36, and another optical fiber 41 extending from a photodetector 40 is force-fitted in a through hole 36a defined axially in the other sealing plug 36. The optical fibers 39, 41 have ends projecting from the sealing plugs 36, 36 in confronting relation to the windows 20a, 20a, respectively, in the supply tube 20.

A pipe 42 is attached to an upper portion of the side wall of the body 26 in communication with the upper larger-diameter hole 28 for supplying a back-pressure generating inert gas such as an argon gas into the larger-diameter hole 28. Another pipe 43 is attached to a lower portion of the side wall of the body 26 in communication with the lower larger-diameter hole 29 for discharging a leaked amount of powdery material from the body 26.

Operation of the powdery material supplying apparatus thus constructed is as follows: The ultrasonic vibrating device 16 has a piezoelectric element or the like for actuating the vibrator 17 with ultrasonic energy to vibrate the vibrator 17. The powdery material 5 supplied from the hopper 6 into the receiver 15 by the metering device 7 is fed into the supply tubes 20 while the powdery material 5 is being vibrated by the vibrator 17 vibrated by the ultrasonic vibrating device 16. The powdery material 5 as it enters the supply tubes 20 is conveyed by gravity and under the pressure of the inert gas supplied from the pipe 4 mounted on the bottom 3, to the plasma torch nozzle 21 in which the powdery material 5 is fed into a plasma arc 44 generated by the plasma torch nozzle 21. The powdery material 5 such as of a hard metal is then sealed in the plasma arc 44 and injected into a molten pool 46 formed on the surface layer of a cast iron member 45, whereupon the powdery material 5 is uniformly dispersed or melted in the molten pool 46 to remelt the cast iron member 45. Since the entire passageway including the supply tubes 20 is vibrated by the vibrator 17, the powdery material 5 flowing therethrough is prevented from being deposited on the inner wall surfaces of the passage 18 in the vibrator 17, the passage 19a in the joint 19, and the tubes 20, 20. Even if some powdery material 5 sticks to the inner wall surfaces, it will soon be shaked off by the vibrating passageway and join the powdery material 5 flowing therethrough. The stable and constant supply of the powdery material 5 through the supply tubes 20, 20 is effective in producing remelted and hardened products of uniform quality. Since the passageway vibrates ultrasonically with small amplitudes, no damage will be caused to the joint 19 and the tubes 20 which may be of a rigid material. The powdery material 5 can therefore be conveyed smoothly and reliably without clogging to the molten pool 46.

While in the illustrated embodiment the ultrasonic vibrating device 16 is connected to the receiver 15 between the powdery material feeding device 1 and the supply tubes 20, 20, the ultrasonic vibrating device 16 may also be installed somewhere on the supply tubes 20, 20. More specifically, where the tubes 20, 20 are considerably long, an ultrasonic vibrating device 160 of the same construction as that of the ultrasonic vibrating device 16 may also be mounted on each of the supply tubes 20, 20 downstream of the joint 19 for more effective prevention of deposition of the powdery material 5 on the inner wall surfaces of the supply tubes 20, 20.

The device 25 for detecting the amount of the supplied powdery material 5 can ascertain the amount of the powdery material 5 supplied through each of the supply tubes 20, 20 by measuring the amount of light transmitted from the light-emitting device 38 and detected by the photodetector 40 through the windows 20a, 20a. The photodetector 40 issues a signal as a function of the amount of the powdery material 5 flowing through the supply tube 20, and such a signal may be processed and sent to an indicator for visual display. The signal may also be employed to control operation of the metering device 7 for varying the amount of the powdery material 5 to be supplied from the feeding device 1. Although the closed space S (FIG. 4) communicates with the interior of the supply tube 20 through the windows 20a, 20a, only a small amount of powdery material 5 leaks from the supply tube 20 via the windows 20a, 20a because the inert gas supplied through the pipe 42 develops a higher back pressure in the closed space S than the pressure in the supply tube 20. Any leaked amount of powdery material 5 is discharged out of the body 26 through the discharge pipe 43 and then recovered.

As an alternative, the powdery material 5 may be prevented from leaking out of the supply tube 20 by closing the discharge pipe 43 and introducing the back-pressure gas from the pipe 42 into the supply tube 20 through the windows 20a, 20a.

Inasmuch as the ends of the optical fibers 36, 38 are spaced from the windows 20a, 20, respectively, no powdery material will be deposited on the ends of the optical fibers 36, 38, and hence optical measurements made by the device 25 will remain stable against errors for a long period of time.

Although the device 25 has been shown as being incorporated in the apparatus for remelting and hardening cast iron members with a plasma arc, the device 25 may be employed in various apparatus for conveying powdery materials. The optical fibers 39, 41 may be dispensed with, and the light-emitting device and photodetector may be disposed in place of the optical fibers 39, 41 for direct transmission and reception of optical signals.

The results of an experiment conducted on an apparatus for supplying a powdery material constructed according to the present invention will be described below. The supply tubes 20 were formed of stainless steel, and had an outside diamter of 2 mm and an inside diameter of 1.5 mm. The argon gas was supplied from the pipe 4 at a rate of 1 liter/min. The powdery material conveyed had a particle size ranging from 1 micron to 50 microns, and was fed at a rate of 0.5 g/min. The ultrasonic vibrator 17 vibrating at a frequency of 2 KHz and powered by 300 W was held in contact with the supply tubes 20, 20 to impart ultrasonic vibrations to the supply tubes 20, 20. The ultrasonic vibrator 1 was energized for 1 minute to convey the powdery material and then de-energized. Then, the supply tubes 20, 20 were inspected for any residual powdery material, but no powdery material was left in the supply tubes 20, 20. When the supply tubes 20, 20 were not ultrasonically vibrated, and the powdery material was conveyed therethrough for 1 minute, 0.18 g of powdery material remained in the supply tubes 20, 20.

An apparatus for remelting and hardening a cast iron material, in which apparatus the powdery material supplying apparatus of the invention can be incorporated, will be described with reference to FIG. 6.

Figure 6:
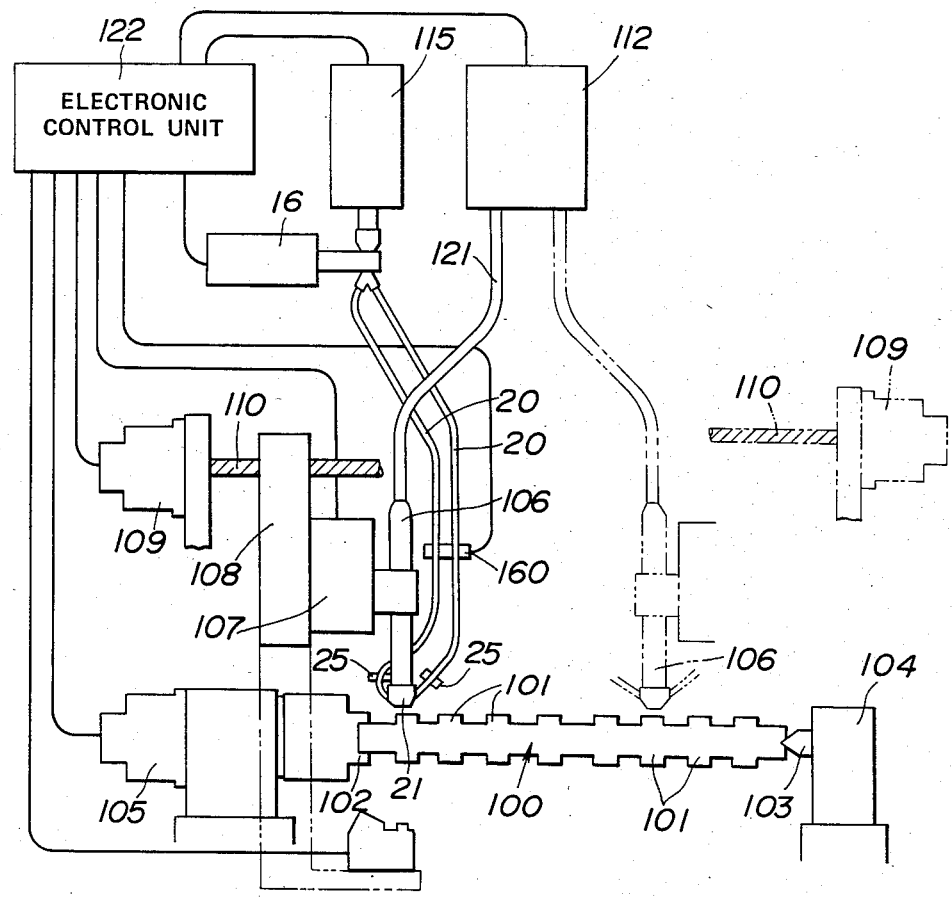
FIG. 6 is a diagrammatic view of an apparatus for remelting and hardening a cast iron member, in which the powdery material supplying apparatus of the present invention can be incorporated.

The apparatus shown in FIG. 6 serves to remelt and harden cams 101 on a workpiece or camshaft 100. The axial ends of the camshaft 100 are supported respectively by a chuck 102 and a center 103, and the camshaft 100 is held in position by a presser cylinder 104 coupled to the center 103 and pressing the camshaft 100 in the axial direction. The chuck 102 is rotated by a motor 105 to rotate the camshaft 100. A plasma torch 106 movable axially along the camshaft 100 is positioned above a desired one of the cams 101. The plasma torch 106 is vertically movably supported by a support frame 108 of a holder 107. The support frame 108 is held in threaded engagement with a feed screw 110 rotated about its own axis by a motor 109. In operation, the camshaft 100 is rotated by the motor 105, the plasma torch 106 is vertically moved to follow the cam profile of the cam 101 to be processed with a constant clearance kept between the cam profile and the nozzle of the plasma torch 106. Over the desired cam 101 to be treated, the plasma torch 106 is reciprocally moved axially along the camshaft 100 so as to follow a meandering path over the cam profile while the camshaft 100 is rotated about its own axis, thereby remelting and hardening the cam surface of the cam 101. The plasma torch 106 is horizontally moved by the feed screw 110 along the camshaft 100 for successively processing the cams 101. In FIG. 6, there are eight cams 101 on the camshaft 100, and two plasma torches 106 employed. Therefore, four cams 101 are remelted by each of the plasma torches 106.

The plasma torch is shown in greater detail in FIG. 1. The plasma torch has the nozzle tip 23 disposed in the hollow shield cap 22 with a passage 47 defined between the nozzle tip 23 and the shield cap 22 for passage of a shield gas such as an inert gas therethrough. The passage 24 for allowing a working gas such as an argon gas to pass therethrough is defined centrally in the nozzle tip 23 and surrounded by a coolant passage 48 defined in the nozzle tip 23. An electrode 49 as of tungsten is positioned in the passage 24 and electrically connected to a power supply 112 (FIG. 6) by a cord 121.

The supply tubes 20, 20 extend obliquely through the lower wall portion of the shield cap 22. The supply tubes 20, 20 are made of a material having a small coefficient of friction, such as stainless steel. The supply tubes 20, 20 are symmetrically attached to the shield cap 22 with their distal ends inclined a prescribed angle with respect to the axis N of the plasma torch nozzle 21 extending in alignment with the axis of the passage 24. As described above, the supply tubes 20, 20 are connected to the powdery material device 1 for supplying the powdery material of metal to the molten pool formed when the cam 101 is melted by the plasma arc, to thereby form a hard alloy layer on the cam surface.

The apparatus illustrated in FIG. 6 also includes an electronic control unit 122 for controlling the motors 105, 109, a motor (not shown) housed in the holder 107 for vertically moving the plasma torch 106, the power supply 112, the powdery material supplying apparatus 115, the ultrasonic vibrating device 16, and the detecting device 121.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A method of supplying a powdery material to a workniece to be processed thereby, comprising the steps of:
   (a) discharging the powdery material from storage means;
   (b) feeding the powdery metal material discharged from said storage means into the tube means extending into the shield cap of a plasma torch nozzle in the vicinity of the workpiece; and
   (c) ultrasonically vibrating said tube means for supplying the powdery material therethrough through said shield cap to said workpiece.

2. A method according to claim 1, including the step of metering said powdering material before it is discharged from said storage means into said tube means.

3. A method according to claim 1, including the step of detecting the amount of the powdery material when it is supplied through said tube means.

4. A method according to claim 3, wherein said amount of the powdery material is detected by a light-emitting device and a photodetector.

5. A method according to claim 1, including the steps of:
   (d) melting the surface of said workpiece with plasma arc; and
   (e) supplying said powdery material from said tube means through said shield cap into said plasma arc so that the powdery material is charged into a molten pool on said workpiece.

6. An apparatus for supplying a powdery metal material to a workpiece to be processed thereby, comprising;
   (a) storage means for storing the powdery material said storage means having an outlet;
   (b) tube means extending from said outlet to a shield cap of a plasma torch nozzle adjacent to said workpiece for conveying the powdery material therethrough and through said shield cap; and
   (c) an ultrasonic vibrating device mounted on said tube means for imparting ultrasonic vibrations to said tube means.

7. An apparatus according to claim 6, including metering means disposed between said outlet and said tube means for metering the powdery material fed into said tube means.

8. An apparatus according to claim 7, wherein said metering means comprises a turntable disposed below said outlet and rotataing in a horizontal plane, and a metering blade spaced a small clearance from an upper surface of said turntable and lying in a substantially vertical plane.

9. An apparatus according to claim 8, wherein said metering blade is vertically movable with respect to said turntable.

10. An apparatus according to claim 8, wherein said metering blade is angularly movable horizontally.

11. An apparatus according to claim 6, including means mounted on said tube means for detecting the amount of the powdery material supplied through said tube means.

12. An apparatus according to claim 11, wherein said tube means has a tubular wall, said detecting means comprising a pair of windows defined in said tubular wall of said tube means in diametrically opposite relation, a tubular body having a closed chamber therein around said tube means at said window, and a light-emitting member and a photodetecting member disposed in said body in confronting relation to said windows, respectively.

13. An apparatus according to claim 12, wherein said detecting means includes a second tube connected to said tubular body for supplying a back-pressure generating gas into said closed chamber to keep a pressure in said closed chamber at a level higher than the pressure in said tube means.

14. An apparatus according to claim 6, wherein said tube means comprises a receiver for receiving said powdery material discharged into said tube means, and a tube for guiding the powdery material from said receiver to the position adjacent to said workpiece.

15. An apparatus according to claim 14, wherein said ultrasonically vibrating device is mounted on at least one of said receiver and said tube.

16. An apparatus according to claim 14, wherein said ultrasonically vibrating device is connected between said receiver and said tube.

* * * * *